(12) United States Patent
Sakakibara et al.

(10) Patent No.: US 8,007,923 B2
(45) Date of Patent: Aug. 30, 2011

(54) METALLIC MEMBER BEING SUBJECTED TO RUST-PREVENTIVE TREATMENT

(75) Inventors: Kazutoshi Sakakibara, Aichi-gun (JP); Yasutaka Hasegawa, Nagoya (JP)

(73) Assignee: Togo Seisakusyo Corporation, Aichi-ken (JP)

( * ) Notice: Subject to any disclaimer, the term of this patent is extended or adjusted under 35 U.S.C. 154(b) by 182 days.

(21) Appl. No.: 12/230,863

(22) Filed: Sep. 5, 2008

(65) Prior Publication Data

US 2009/0068493 A1 Mar. 12, 2009

(30) Foreign Application Priority Data

Sep. 7, 2007 (JP) ................ 2007-232772
Aug. 6, 2008 (JP) ................ 2008-203010

(51) Int. Cl.
*B32B 15/04* (2006.01)
*B32B 15/08* (2006.01)
*B32B 15/082* (2006.01)
*B32B 15/092* (2006.01)

(52) U.S. Cl. .......... 428/626; 428/632; 428/659

(58) Field of Classification Search .......... 428/626, 428/658, 659, 632, 633, 687, 457, 688, 704
See application file for complete search history.

(56) References Cited

U.S. PATENT DOCUMENTS

2006/0041047 A1* 2/2006 Ramsey ................ 524/430

FOREIGN PATENT DOCUMENTS

| EP | 0 448 130 | 9/1991 |
| JP | 06-146005 | 5/1994 |
| JP | 2004-27330 | 1/2004 |

OTHER PUBLICATIONS

Machine Translation, Ishizuka et al., JP 2004-027330, Jan. 2004.*
Krasnoyarskii et al. "Protective action of inc coatings painted with EP-525 epoxy lacquer in neutral aqueous media" Chemical Abstracts Service, Aug. 23, 1991; XP002510509; 2 pages.

* cited by examiner

*Primary Examiner* — Michael La Villa
(74) *Attorney, Agent, or Firm* — Jacobson Holman PLLC

(57) ABSTRACT

A metallic member, which is subjected to rust-preventive treatment, includes a metallic substrate, a zinc composite coating film, and a coating layer. The metallic substrate is formed as a predetermined configuration. The zinc composite coating film is disposed on the metallic substrate. The coating layer is made by coating and drying a coating composition on the zinc composite coating film. The coating composition includes a coating vehicle, a body pigment, and a rust-preventive pigment. The coating vehicle includes an organic solvent, and a resinous material being dissolved in the organic solvent. The body pigment is dispersed in the coating vehicle. The rust-preventive pigment is dispersed in the coating vehicle.

9 Claims, 3 Drawing Sheets

METALLIC MEMBER BEING SUBJECTED TO RUST-PREVENTIVE TREATMENT

INCORPORATION BY REFERENCE

The present invention is based on Japanese Patent Application No. 2007-232,772, filed on Sep. 7, 2007, and on Japanese Patent Application No. 2008-203,010, filed on Aug. 6, 2008, the entire contents of which are incorporated herein by reference.

BACKGROUND OF THE INVENTION

1. Field of the Invention

The present invention relates to a metallic member, on one of whose surfaces a zinc composite coating film and a coating layer are formed and which is thereby subjected to a rust-preventive treatment. Moreover, it relates to a coating composition, which is used for metallic members of this type.

2. Description of the Related Art

As a rust-preventive technique, it has been known conventionally to form a zinc composite coating film on a surface of metallic member, thereby undergoing the metallic member a rust-preventive treatment. Because of the rust-preventive action (or self-sacrificing corrosion preventive action) of zinc that is included in the zinc composite coating film, rust is less likely to occur on metallic members that are subjected to rust-preventive treatments of this kind. Moreover, as disclosed in Japanese Unexamined Patent Publication (KOKAI) Gazette No. 6-146,005, a technique is proposed in order to maintain the rust-preventive action of zinc over a long period of time by forming a coating layer on the zinc composite coating film.

Specifically, Japanese Unexamined Patent Publication (KOKAI) Gazette No. 6-146,005 discloses such a technique as forming a zinc composite coating film by performing a metallic powder-chromium oxide treatment (or so-called "DACTROTIZED" treatment (Trademark)) to a surface of metallic member and then further forming a coating layer, which is made from an aqueous processing liquid, on the resulting zinc composite coating film. For example, the aqueous processing liquid contains an aqueous resin, and a silica material. The technique disclosed in the publication makes it possible to maintain the rust-preventive action of the zinc composite coating film for a long period of time relatively, because the coating layer can isolate the zinc composite coating film and metallic member from environments. Moreover, the coating layer might be able to deform so as to follow the metallic member's elastic deformations, because it contains a resinous component. Therefore, even when the resultant metallic member is used for hose clamps and springs, it might be possible to shut off the zinc composite coating film and metallic member from the surroundings.

However, in the raw material of the coating layer (hereinafter referred to as a "coating composition") that is disclosed in Japanese Unexamined Patent Publication (KOKAI) Gazette No. 6-146,005, an aqueous resin and a silica material are dispersed in water. The aqueous resin in such a coating composition disperses in water as emulsion particles, because it does not dissolve in water. To put it differently, the aqueous resin exists as particles with relatively large molecular weights in the coating composition. Accordingly, it is hard to control the viscosity of coating composition by the technique disclosed in the publication, and consequently it has been difficult to make the resulting coating layer thinner.

Moreover, in a coating composition of this type, the aqueous resin, which comprises polymeric emulsion particles, cures to form networks when the coating composition forms a coating layer, in particular when it undergoes a baking treatment. Accordingly, it is difficult to soften the resulting coating layer sufficiently by the technique disclosed in Japanese Unexamined Patent Publication (KOKAI) Gazette No. 6-146,005, and consequently it has been difficult to produce a coating layer which is less likely to come off, or in which cracks are less likely to occur. When a coating layer comes off, it is difficult to maintain the rust-preventive action of zinc composite coating film for a long period of time. Therefore, it might have been difficult to give metallic members, which are subjected to rust-preventive treatments, much better rust-preventive performance.

SUMMARY OF THE INVENTION

The present invention has been developed in view of the aforementioned circumstances. It is therefore an object of the present invention to provide a metallic member, which is subjected to a rust-preventive treatment, thereby demonstrating much better rust-preventive performance; whose coating layer is made thinner; and whose coating layer is inhibited from coming off. Moreover, it is another object of the present invention to provide a coating composition, which enables a metallic member that has undergone a rust-preventive treatment to demonstrate much better rust-preventive performance; which makes it possible to make the resulting coating layer thinner; and which can inhibit the resultant coating layer from coming off.

A metallic member according to the present invention can solve the aforementioned problems, is a metallic member that is subjected to rust-preventive treatment, and comprises:

a metallic substrate being formed as a predetermined configuration;

a zinc composite coating film being disposed on the metallic substrate;

a coating layer being made by coating and drying a coating composition on the zinc composite coating film; and the coating composition comprising a coating vehicle including an organic solvent and a resinous material being dissolved in the organic solvent, a body pigment being dispersed in the coating vehicle, and a rust-preventive pigment being dispersed in the coating vehicle.

The present metallic member can preferably further comprise at least one of following optional arrangements (1) through (9).

(1) In the present metallic member, the rust-preventive pigment can preferably comprise at least one member being selected from the group consisting of phosphate, and silicate.

(2) In the present metallic member, the phosphate can preferably comprise at least one member being selected from the group consisting of zinc phosphate, calcium phosphate, magnesium phosphate, aluminum phosphate, zinc phosphite, calcium phosphite, magnesium phosphite, aluminum phosphite, zinc polyphosphate, calcium polyphosphate, magnesium polyphosphate, and aluminum polyphosphate.

(3) In the present metallic member, the silicate can preferably comprise at least one member being selected from the group consisting of sodium silicate, potassium silicate, and lithium silicate.

(4) In the present metallic member, the coating layer can preferably comprise the rust-preventive pigment in an amount of from 9 to 13% by mass when the coating layer is 100% by mass.

(5) In the present metallic member, the body pigment can preferably comprise at least one member being selected from the group consisting of talc, magnesium silicate, aluminum sulfate, and barium sulfate. Moreover, the coating layer can more preferably comprise the body pigment in an amount of from 42 to 50% by mass when the coating layer is 100% by mass. In addition, the body pigment can more preferably exhibit a D90 value, a mass accumulated particle diameter being 18 μm or more that is measured by means of laser diffraction particle-size analyzing method.

(6) In the present metallic member, the organic solvent can preferably comprise at least one member being selected from the group consisting of an aromatic solvent, an alcohol solvent, and a ketone solvent. The aromatic solvent can preferably comprise at least one member being selected from the group consisting of toluene, xylene, and ethylbenzene. The alcohol solvent can preferably comprise at least one member being selected from the group consisting of ethylene glycol monobutyl ether, butanol, methanol, and phenol. The ketone solvent can preferably comprise at least one member being selected from the group consisting of methyl ethyl ketone, and methyl butyl ketone.

(7) In the present metallic member, the resinous material can preferably comprise at least one member being selected from the group consisting of an epoxy resin, a phenol resin, and an acrylic resin.

(8) In the present metallic member, the coating composition can preferably comprise: the organic solvent in an amount of from 50 to 59% by mass; the resinous material in an amount of from 10 to 15% by mass; the body pigment in an amount of from 17 to 24% by mass; and the rust-preventive pigment in an amount of from 4 to 6% by mass, when the coating composition is 100% by mass.

(9) In the present metallic member, the coating layer can preferably exhibit a scratch hardness of from "F" to "B" by means of pencil method.

A coating composition according to the present invention can solve the aforementioned problems, is a coating composition for making a coating layer being coated on a zinc composite coating film, and comprises:

a coating vehicle comprising an organic solvent, and a resinous material being dissolved in the organic solvent;

a body pigment being dispersed in the coating vehicle; and a rust-preventive pigment being dispersed in the coating vehicle.

The present coating composition can preferably further comprise at least one of following optional arrangements (10) through (14).

(10) In the present coating composition, the rust-preventive pigment can preferably comprise at least one member being selected from the group consisting of phosphate, and silicate.

(11) In the present coating composition, the phosphate can preferably comprise at least one member being selected from the group consisting of zinc phosphate, calcium phosphate, magnesium phosphate, aluminum phosphate, zinc phosphite, calcium phosphite, magnesium phosphite, aluminum phosphite, zinc polyphosphate, calcium polyphosphate, magnesium polyphosphate, and aluminum polyphosphate.

(12) In the present coating composition, the silicate can preferably comprise at least one member being selected from the group consisting of sodium silicate, potassium silicate, and lithium silicate.

(13) The coating composition can preferably comprise the rust-preventive pigment in an amount of 4 to 6% by mass when the coating composition is 100% by mass.

(14) In the present coating composition, the body pigment can preferably comprise at least one member being selected from the group consisting of talc, magnesium silicate, aluminum sulfate, and barium sulfate. Moreover, the coating composition can more preferably comprise the body pigment in an amount of from 17 to 24% by mass when the coating composition is 100% by mass. In addition, the body pigment can more preferably exhibit a D90 value, a mass accumulated particle diameter being 18 μm or more that is measured by means of laser diffraction particle-size analyzing method.

In the present metallic member being subjected to rust-preventive treatment, a mixture, which comprises an organic solvent, a resinous material, a body pigment and a rust-preventive pigment, that is, a lacquer-system material, is used as a coating composition. The organic solvent functions as a medium for dissolving the resinous material, that is, as a solvent. Using an organic solvent as the solvent enables the resinous material to disperse within the organic solvent in molecular state in the resulting coating composition. In other words, the resinous material in the resultant coating composition exists in such a state that low-molecular-weight molecules are dissolved within the organic solvent. Hence, when making the present metallic member, it is possible to make the coating layer thinner because it is possible to control the viscosity of the coating composition with ease.

Moreover, the resinous material is present as stable low-molecular-weight molecules within the coating composition, because the organic solvent is used as the solvent for the coating composition. Accordingly, when forming the coating layer, in particular, when subjecting the coating composition to baking processes, the resinous material's molecules, that is, the low-molecular-weight molecules cross-link three-dimensionally to each other. Consequently, the resinous material forms high-density networks in the resulting coating layer. Therefore, when making the present rust-preventive metallic member being subjected to rust-preventive treatment, it is possible to soften the coating layer sufficiently, and thereby it is possible to inhibit the coating layer from coming off.

In addition, when making the present metallic member being subjected to rust-preventive treatment, the coating layer can be softened furthermore because the coating composition comprises a body pigment.

Moreover, in the present metallic member being subjected to rust-preventive treatment, the coating layer can also inhibit rust from arising on the metallic substrate making the innermost metallic member because the coating composition comprises a rust-preventive pigment.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
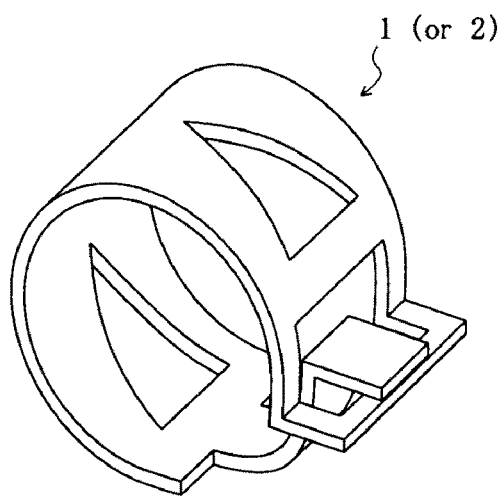
FIG. 1 is a perspective diagram for illustrating a metallic substrate for making a rust-preventive metallic member according to Example No. 1 of the present invention.

Having generally described the present invention, a further understanding can be obtained by reference to the specific preferred embodiments which are provided herein for the purpose of illustration only and not intended to limit the scope of the appended claims.

A metallic member being subjected to rust-preventive treatment (herein after abbreviated to as a "rust-preventive metallic member") according to the present invention comprises a metallic substrate, a zinc composite coating film, and a coating layer. The zinc composite coating film is disposed on the metallic substrate. The coating layer is made by coating and drying a coating composition on the zinc composite coating film. The present rust-preventive metallic member can demonstrate especially good rust-preventive performance when being used as a metallic component part that undergoes elastic deformation in service, such as hose clamps and springs, for instance, because the coating layer so soft that it is likely to deform. However, the present rust-preventive metallic member can be used even for a metallic component part that does not undergo any elastic deformation in service, such as bolts, for instance. Note that, in the present rust-preventive metallic component part, the metallic substrate making the innermost metallic member has a predetermined configuration. The term, "predetermined configuration," set forth herein is a concept that includes a variety of configurations, which are represented by clip shapes, spring shapes and plate shapes, for instance, but does not designate any specific configurations at all.

As for the zinc composite coating film, it is possible to employ a usual coating film that comprises zinc. For example, as a general coating film in which an organic or inorganic binder binds a flake-shaped or granular zinc powder, it is possible to name a zinc composite coating film, which is made by the "DACTROTIZED" treatment (Trademark), and a zinc composite coating film, which is made by the "GEOMET" treatment (Trademark). These zinc composite coating films can be used preferably, because they are good in terms of rust-preventive performance.

The coating composition comprises a rust-preventive pigment, a body pigment, a resinous material, and an organic solvent. As for the rust-preventive pigment, it is preferable to employ those with small particle diameters.

Meanwhile, on a surface of zinc that is included in the zinc composite coating film, an oxidized film (a so-called passive film) might arise. When a passive film arises, zinc being covered with the passive film becomes less likely to corrode or corrode excessively. Note herein that phosphate stabilizes the resulting passive film over a long period of time because it releases phosphate ions gradually to keep the zinc composite coating film being in alkaline state. Accordingly, using phosphate as the rust-preventive pigment for the coating composition makes it possible to inhibit the excessive corrosion of zinc over a long period of time, and thereby makes it possible to maintain the rust-prevention action of zinc for a long period of time. Moreover, silicate stabilizes the resultant passive film over a long period of time because it releases silicate ions gradually to keep the zinc composite coating film being in alkaline state. Consequently, using silicate as the rust-preventive pigment for the coating composition can inhibit zinc from corroding excessively over a long period of time, and thereby enables zinc to maintain the rust-prevention action for a long period of time.

Accordingly, employing at least one of phosphate and silicate as the rust-preventive pigment for the coating composition makes it possible to maintain the rust-preventive action of the zinc composite coating film over a long period of time, because it is possible inhibit zinc in the zinc composite coating film from eluting out therefrom. Consequently, when at least one of phosphate and silicate is used as the rust-preventive pigment for the coating composition, the rust-preventive metallic member according to the present invention demonstrates extremely good rust-preventive performance. Moreover, when at least one of phosphate and silicate is used as the rust-preventive pigment for the coating composition, it is possible to give not only rust-preventive performance but also insulative performance to the coating layer. Hence, if such is the case, the present rust-preventive metallic member is less likely to rust even when it comes into contact with metals of different species.

As for the phosphate, it is preferable to employ at least one member that is selected from the group consisting of zinc phosphate, calcium phosphate, magnesium phosphate, aluminum phosphate, zinc phosphite, calcium phosphite, magnesium phosphite, aluminum phosphite, zinc polyphosphate, calcium polyphosphate, magnesium polyphosphate, and aluminum polyphosphate. This is because these phosphates dissolve little by little (or gradually) to gradually release phosphate ions. Moreover, as for the silicate, it is preferable to employ at least one member that is selected from the group consisting of sodium silicate, potassium silicate and lithium silicate. This is because these silicates also dissolve gradually to gradually release silicate ions.

The phosphate can preferably be included in an amount of from 4 to 6% by mass when the coating composition is 100% by mass. When the phosphate is included in an amount of 4% by mass or more when the coating composition is 100% by mass, the phosphate can give the coating layer excellent rust-preventive performance. Moreover, when the phosphate is included in an amount of 6% by mass or less when the coating composition is 100% by mass, it is possible to soften the coating layer sufficiently. It is more preferable to include the phosphate in an amount of from 2 to 8% by mass, much more preferably from 4 to 6% by mass, when the coating composition is 100% by mass. In this instance, note that the blending amount of the phosphate can be converted into 9 to 13% by mass when the coating layer is 100% by mass.

The silicate can preferably be included in an amount of from 4 to 6% by mass when the coating composition is 100% by mass. When the silicate is included in an amount of 4% by mass or more when the coating composition is 100% by mass, the silicate can give the coating layer excellent rust-preventive performance. Moreover, when the silicate is included in an amount of 6% by mass or less when the coating composition is 100% by mass, it is possible to soften the coating layer sufficiently. It is more preferable to include the silicate in an amount of from 2 to 8% by mass, much more preferably from 4 to 6% by mass, when the coating composition is 100% by mass. In this instance, note that the blending amount of the silicate can be also converted into 9 to 13% by mass when the coating layer is 100% by mass.

When a rust-preventive pigment other than the phosphate and silicate is used, it is preferable as well that another rust-preventive pigment can be included in an amount of from 4 to 6% by mass when the coating composition is 100% by mass. In this instance, note that the blending amount of another rust-preventive pigment can be also converted into 9 to 13% by mass when the coating layer is 100% by mass.

As for the body pigment, it is preferable to employ those being soft. For example, it is especially preferable to use at least one member that is selected from the group consisting of talc, magnesium silicate, aluminum sulfate, and barium sulfate, because they are soft.

The body pigment can preferably be included in an amount of from 17 to 24% by mass when the coating composition is 100% by mass. When the body pigment is included in an amount of 17% by mass or more when the coating composition is 100% by mass, the body pigment can soften the coating layer. Moreover, when the body pigment is included in an a mount of 24% by mass or less when the coating composition is 100% by mass, the body pigment can disperse in the coating composition uniformly. It is more preferable to include the body pigment in an amount of from 15 to 27% by mass, much more preferably from 17 to 24% by mass when the coating composition is 100% by mass. In this instance, note that, when the body pigment comprises at least one member being selected from the group consisting of talc, magnesium silicate, aluminum sulfate, and barium sulfate, the blending amount of the body pigment can be converted into 42 to 50% by mass when the coating layer is 100%.

As for the resinous material, it is preferable to employ those which are good in terms of adhesiveness to metal and in terms of water resistance, and which exhibit low viscosity in the dissolved state. As such a resinous material, it is possible to name epoxy resins and phenol resins. The resinous material can preferably be included in an amount of from 10 to 15% by mass when the coating composition is 100% by mass. When the resinous material is included in an amount of 10% by mass or more when the coating composition is 100% by mass, the resinous material can soften the coating layer satisfactorily. Moreover, when the resinous material is included in an amount of 15% by mass or less when the coating composition is 100% by mass, it is possible to make the blending amounts of the rust-preventive pigment, body pigment and organic solvent greater in the coating composition. It is more preferable to include the resinous material in an amount of from 5 to 20% by mass, much more preferably from 10 to 15% by mass, when the coating composition is 100% by mass. In this instance, note that the blending amount of the resinous material can be converted into 24 to 31% by mass when the coating layer is 100% by mass.

As for the organic solvent, it is preferable to employ aromatic solvents, alcohol solvents and ketone solvents which exhibit high boiling points and to which the resinous material exhibits a large solubility. As an aromatic solvent, it is possible to name toluene, xylene and ethylbenzene. As an alcohol solvent, it is possible to name ethylene glycol monobutyl ether, butanol, methanol and phenol. As a ketone solvent, it is possible to name methyl ethyl ketone and methyl butyl ketone. It is allowable to use these organic solvents independently, or it is allowable to mix a plurality of them to use. The organic solvent can preferably be included in an amount of from 50 to 59% by mass when the coating composition is 100% by mass. When the organic solvent is included in an amount of 50% by mass or more when the coating composition is 100% by mass, the rust-preventive pigment, body pigment and resinous material can disperse in the organic solvent more uniformly. Moreover, when the organic solvent is included in an amount of 59% by mass or less when the coating composition is 100% by mass, it is possible to make the blending amounts of the rust-preventive pigment, body pigment and organic solvent greater in the coating composition. Note that, in the coating composition, it is more preferable to include the organic solvent in an amount of from 49 to 64% by mass, much more preferably from 50 to 59% by mass, when the coating composition is 100% by mass.

In the rust-preventive metallic member according to the present invention, the coating layer can preferably exhibit a scratch hardness of from "F" to "B" by means of pencil method. When the scratch hardness of the coating layer falls in this range, the coating layer is softened satisfactorily, but produces sufficient strength securely. Note that the "scratch hardness" set forth in the present specification refers to the scratch hardness as defined in JIS (Japanese Industrial Standards) K 5600-5-4.

Moreover, in addition to the rust-preventive pigment, the body pigment, the resinous material and the organic solvent, it is allowable to further blend a coloring pigment to make the coating composition according to the present invention. As for the coloring pigment, it is possible to employ those being used commonly. For example, as a coloring pigment, it is possible to use at least one member that can be preferably selected from the group consisting of carbon black, iron oxide (or triiron tetroxide, $Fe_3O_4$), titanium oxide and zinc oxide.

EXAMPLES

Hereinafter, rust-preventive metallic members and coating compositions according to examples of the present invention will be described in detail.

Example No. 1

Figure 2:
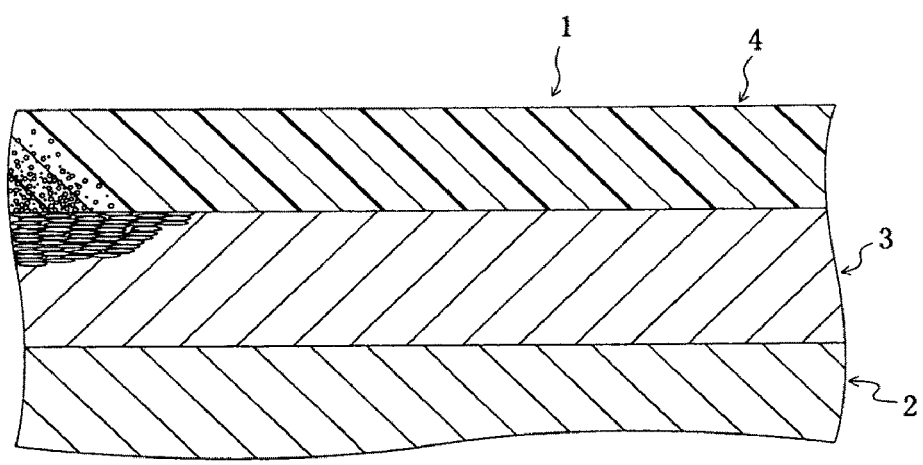
FIG. 2 is a cross-sectional diagram for schematically illustrating the present rust-preventive metallic member according to Example No. 1.

FIG. 1 shows a metallic substrate for making a rust-preventive metallic member according to Example No. 1 of the present invention in a perspective diagram. FIG. 2 shows the present rust-preventive metallic member according to Example No. 1 schematically in a cross-sectional diagram.

As illustrated in FIG. 1, a hose clamp is the metallic substrate (or the innermost metallic member) for making the present rust-preventive metallic member 1 according to Example No. 1. As illustrated in FIG. 2, the present rust-preventive metallic member 1 according to Example No. 1 comprises a metallic substrate 2, a zinc composite coating film 3, and a coating layer 4. The zinc composite coating film 3 is disposed on the metallic substrate 2. The coating layer 4 is disposed on the zinc composite coating film 3.

The metallic substrate 2 was made of steel, and had a hose-clamp configuration as shown in FIG. 1. As a material for the zinc composite coating film 3 (herein after referred to as a "coating-film material"), "GEOMET 720" (produced by NIPPON DACRO SHAMROCK Co., LTD.) was used. As a material for the coating layer 4 (hereinafter referred to as a "coating composition"), a mixture of the following was used: methyl ethyl ketone (i.e., the claimed organic solvent) in an amount of 55 parts by mass; an epoxy resin (i.e., the claimed resinous material) in an amount of 14 parts by mass; magnesium silicate (i.e., the claimed body pigment) in an amount of 21 parts by mass; zinc phosphate (i.e., the claimed rust-preventive pigment) in an amount of 5 parts by mass; and titanium oxide (i.e., a coloring pigment) in an amount of 5 parts by mass, when they made 100 parts by mass, the entire coating composition. The present rust-preventive metallic member 1 according to Example No. 1 was manufactured as hereinafter described.

First of all, the metallic substrate 2, which had been prepared in advance, was subjected to a shot peening treatment, thereby turning the oxide film on the surface of the metallic substrate 2 into a roughened surface. The metallic substrate 2, which had undergone the shot peening treatment, was immersed into the "ZIOMET 720" processing liquid, which was heated to a temperature of from 20 to 25° C., for from 2 to 6 minutes. After the immersion, the "ZIOMET 720" processing liquid was adhered to the metallic substrate 2 using a dip spinning apparatus, and then the metallic substrate 2 was heated at a temperature of from 320 to 360° C. in an electric-heating type hot-air circulator oven for from 30 to 45 minutes. After the heating, the metallic substrate 2 was left to cool at room temperature. The above-described procedures were repeated twice, thereby making an intermediate product of the present rust-preventive metallic member 1 according to Example No. 1. Note that the zinc composite coating film 3 was formed on the metallic substrate 2 in a coating amount of 220 mg/dm$^2$.

Subsequently, a mixture of the resinous material, body pigment rust-preventive pigment and coloring pigment (hereinafter referred to as a "powdery coating material") was pulverized with a beads mill for 180 minutes. The powdery coating material, which had undergone the pulverizing, was mixed with the organic solvent, there by preparing a coating composition. In this instance, note that the resinous material was dissolved in the organic solvent to make the claimed coating vehicle, and that the body pigment, rust-prevent pigment and coloring pigment were dispersed in the coating vehicle comprising the organic solvent and resinous material. Then, the above-described intermediate product of the present rust-preventive metallic member 1 according to Example No. 1 was immersed into the resulting coating composition, which was held at room temperature, for from 2 to 6 minutes. After the immersion, the coating composition was adhered to the intermediate product using a dip spinning apparatus, and then the intermediate product was heated at a temperature of from 160 to 220° C. in an electric-heating type hot-air circulator oven for from 15 to 45 minutes. After the heating, the intermediate product was left to cool at room temperature. The above-described procedures were repeated twice, thereby forming the coating layer 4 on the intermediate product, that is, on the zinc composite coating film 3. On this occasion, note that the coating layer 4 was formed on the zinc composite coating film 3 in a coating amount of 150 mg/dm$^2$. Also note that, in the present rust-preventive metallic member according to Example No. 1, the coating layer 4 comprised the resinous material in an amount of about 31% by mass, the body pigment in an amount of about 47% by mass, the rust-preventive pigment in an amount of about 11% by mass, and the coloring pigment in an amount of about 11% by mass, when the coating layer 4 was 100% by mass.

Thus, the present rust-preventive metallic member 1 according to Example No. 1 was manufactured as illustrated in FIG. 2 by way of the above-described manufacturing steps. As described above, the present metallic member 1 according to Example No. 1 comprised the metallic substrate 2, the zinc composite coating film 3, and the coating layer 4. The zinc composite coating film 3 was formed on the metallic substrate 2. The coating layer 4 was formed on the zinc composite coating film 3.

Example No. 2

Except that the composition of the coating composition differed from that of the coating composition in Example No. 1, a rust-preventive metallic member 1 according to Example No. 2 of the present invention was manufactured in the same manner as the present rust-preventive metallic member 1 according to Example No. 1. The present rust-preventive metallic member 1 according to Example No. 2 was manufactured using a mixture of the following as the coating composition: methyl ethyl ketone in an amount of 55 parts by mass; a phenol resin (i.e., the claimed resinous material) in an amount of 14 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 2, note that the coating layer 4 comprised the resinous material in an amount of about 31% by mass, the body pigment in an amount of about 47% by mass, the rust-preventive pigment in an amount of about 11% by mass, and the coloring pigment in an amount of about 11% by mass, when the coating layer 4 was 100 parts by mass. Moreover, in the present rust-preventive metallic member 1 according to Example No. 2, the powdery coating material was pulverized for 180 minutes.

Example No. 3

Except that the composition of the coating composition differed from that of the coating composition in Example No. 1, a rust-preventive metallic member 1 according to Example No. 3 of the present invention was manufactured in the same manner as the present rust-preventive metallic member 1 according to Example No. 1. The present rust-preventive metallic member 1 according to Example No. 3 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 3, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 3, the powdery coating material was pulverized for 180 minutes.

Example No. 4

Except that the composition of the coating composition differed from that of the coating composition in Example No. 1, a rust-preventive metallic member 1 according to Example No. 4 of the present invention was manufactured in the same manner as the present rust-preventive metallic member 1 according to Example No. 1. The present rust-preventive metallic member 1 according to Example No. 4 was manufactured using a mixture of the following as the coating composition: methyl ethyl ketone in an amount of 59 parts by mass; an epoxy resin in an amount of 5 parts by mass; a phenol resin in an amount of 5 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 4, note that the coating layer 4 comprised the resinous material in an amount of about 24% by mass (i.e., a summed mass percentage of the epoxy resin and phenol resin), the body pigment in an amount of about 51% by mass, the rust-preventive pigment in an amount of about 12% by mass, and the coloring pigment in an amount of about 12% by mass, when the coating layer 4 was 100% by mass. Moreover, in the present rust-preventive metallic member 1 according to Example No. 4, the powdery coating material was pulverized for 180 minutes.

Example No. 5

Except that the composition of the coating composition differed from that of the coating composition in Example No. 1, a rust-preventive metallic member 1 according to Example No. 5 of the present invention was manufactured in the same manner as the present rust-preventive metallic member 1 according to Example No. 1. The present rust-preventive metallic member 1 according to Example No. 5 was manufactured using a mixture of the following as the coating composition: methyl ethyl ketone in an amount of 54 parts by mass; an epoxy resin in an amount of 7.5 parts by mass; a phenol resin in an amount of 7.5 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 5, note that the coating layer 4 comprised the resinous material in an amount of about 33% by mass (i.e., a summed mass percentage of the epoxy resin and phenol resin), the body pigment in an amount of about 46% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 5, the powdery coating material was pulverized for 180 minutes.

Example No. 6

Except that the composition of the coating composition differed from that of the coating composition in Example No. 1, a rust-preventive metallic member 1 according to Example No. 6 of the present invention was manufactured in the same manner as the present rust-preventive metallic member 1 according to Example No. 1. The present rust-preventive metallic member 1 according to Example No. 6 was manufactured using a mixture of the following as the coating composition: methyl ethyl ketone in an amount of 49 parts by mass; an epoxy resin in an amount of 20 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 6, note that the coating layer 4 comprised the resinous material in an amount of about 39% by mass, the body pigment in an amount of about 41% by mass, the rust-preventive pigment in an amount of about 10% by mass, and the coloring pigment in an amount of about 10% by mass, when the coating layer 4 was 100% by mass. Moreover, in the present rust-preventive metallic member 1 according to Example No. 6, the powdery coating material was pulverized for 180 minutes.

Example No. 7

Except that the composition of the coating composition differed from that of the coating composition in Example No. 1, a rust-preventive metallic member 1 according to Example No. 7 of the present invention was manufactured in the same manner as the present rust-preventive metallic member 1 according to Example No. 1. The present rust-preventive metallic member 1 according to Example No. 7 was manufactured using a mixture of the following as the coating composition: methyl ethyl ketone in an amount of 64 parts by mass; an epoxy resin in an amount of 5 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 7, note that the coating layer 4 comprised the resinous material in an amount of about 14% by mass, the body pigment in an amount of about 58% by mass, the rust-preventive pigment in an amount of about 14% by mass, and the coloring pigment in an amount of about 14% by mass, when the coating layer 4 was 100% by mass. Moreover, in the present rust-preventive metallic member 1 according to Example No. 7, the powdery coating material was pulverized for 180 minutes.

Example No. 8

Except that the composition of the coating composition differed from that of the coating composition in Example No. 1, a rust-preventive metallic member 1 according to Example No. 8 of the present invention was manufactured in the same manner as the present rust-preventive metallic member 1 according to Example No. 1. The present rust-preventive metallic member 1 according to Example No. 8 was manufactured using a mixture of the following as the coating composition: methyl ethyl ketone in an amount of 59 parts by mass; an epoxy resin in an amount of 7 parts by mass; a phenol resin in an amount of 7 parts by mass; magnesium silicate in an amount of 17 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 8, note that the coating layer 4 comprised the resinous material in an amount of about 34% by mass (i.e., the summed mass percentage of the epoxy resin and phenol resin), the body pigment in an amount of about 42% by mass, the rust-preventive pigment in an amount of about 12% by mass, and the coloring pigment in an amount of about 12% by mass, when the coating layer 4 was 100% by mass. Moreover, in the present rust-preventive metallic member 1 according to Example No. 8, the powdery coating material was pulverized for 180 minutes.

Example No. 9

Except that the composition of the coating composition differed from that of the coating composition in Example No. 1, a rust-preventive metallic member 1 according to Example No. 9 of the present invention was manufactured in the same manner as the present rust-preventive metallic member 1 according to Example No. 1. The present rust-preventive metallic member 1 according to Example No. 9 was manufactured using a mixture of the following as the coating composition: methyl ethyl ketone in an amount of 52 parts by mass; an epoxy resin in an amount of 7 parts by mass; a phenol resin in an amount of 7 parts by mass; magnesium silicate in an amount of 24 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 9, note that the coating layer 4 comprised the resinous material in an amount of about 29% by mass (i.e., a summed mass percentage of the epoxy resin and phenol resin), the body pigment in an amount of about 50% by mass, the rust-preventive pigment in an amount of about 10% by mass, and the coloring pigment in an amount of about 10% by mass, when the coating layer 4 was 100% by mass. Moreover, in the present rust-preventive metallic member 1 according to Example No. 9, the powdery coating material was pulverized for 180 minutes.

Example No. 10

Except that the composition of the coating composition differed from that of the coating composition in Example No. 1, a rust-preventive metallic member 1 according to Example No. 10 of the present invention was manufactured in the same manner as the present rust-preventive metallic member 1 according to Example No. 1. The present rust-preventive metallic member 1 according to Example No. 10 was manufactured using a mixture of the following as the coating composition: methyl ethyl ketone in an amount of 55 parts by mass; an epoxy resin in an amount of 7 parts by mass; a phenol resin in an amount of 7 parts by mass; talc (i.e., the claimed body pigment) in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 10, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 10, the powdery coating material was pulverized for 180 minutes.

Example No. 11

Except that the composition of the coating composition differed from that of the coating composition in Example No. 1, a rust-preventive metallic member 1 according to Example No. 11 of the present invention was manufactured in the same manner as the present rust-preventive metallic member 1 according to Example No. 1. The present rust-preventive metallic member 1 according to Example No. 11 was manufactured using a mixture of the following as the coating composition: methyl ethyl ketone in an amount of 55 parts by mass; an epoxy resin in an amount of 7 parts by mass; a phenol resin in an amount of 7 parts by mass; aluminum sulfate (i.e., the claimed body pigment) in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 11, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 11, the powdery coating material was pulverized for 180 minutes.

Example No. 12

Except that the composition of the coating composition differed from that of the coating composition in Example No. 1, a rust-preventive metallic member 1 according to Example No. 12 of the present invention was manufactured in the same manner as the present rust-preventive metallic member 1 according to Example No. 1. The present rust-preventive metallic member 1 according to Example No. 12 was manufactured using a mixture of the following as the coating composition: methyl ethyl ketone in an amount of 55 parts by mass; an epoxy resin in an amount of 7 parts by mass; a phenol resin in an amount of 7 parts by mass; barium sulfate (i.e., the claimed body pigment) in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 12, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 12, the powdery coating material was pulverized for 180 minutes.

Example No. 13

Except that the composition of the coating composition differed from that of the coating composition in Example No. 1, a rust-preventive metallic member 1 according to Example No. 13 of the present invention was manufactured in the same manner as the present rust-preventive metallic member 1 according to Example No. 1. The present rust-preventive metallic member 1 according to Example No. 13 was manufactured using a mixture of the following as the coating composition: methyl ethyl ketone in an amount of 61 parts by mass; an epoxy resin in an amount of 7 parts by mass; a phenol resin in an amount of 7 parts by mass; magnesium silicate in an amount of 15 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 13, note that the coating layer 4 comprised the resinous material in an amount of about 36% by mass (i.e., a summed mass percentage of the epoxy resin and phenol resin), the body pigment in an amount of about 39% by mass, the rust-preventive pigment in an amount of about 13% by mass, and the coloring pigment in an amount of about 13% by mass, when the coating layer 4 was 100% by mass. Moreover, in the present rust-preventive metallic member 1 according to Example No. 13, the powdery coating material was pulverized for 180 minutes.

Example No. 14

Except that the composition of the coating composition differed from that of the coating composition in Example No. 1, a rust-preventive metallic member 1 according to Example No. 14 of the present invention was manufactured in the same manner as the present rust-preventive metallic member 1 according to Example No. 1. The present rust-preventive metallic member 1 according to Example No. 14 was manufactured using a mixture of the following as the coating composition: methyl ethyl ketone in an amount of 49 parts by mass; an epoxy resin in an amount of 7 parts by mass; a phenol resin in an amount of 7 parts by mass; magnesium silicate in an amount of 27 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 14, note that the coating layer 4 comprised the resinous material in an amount of about 27% by mass (i.e., a summed mass percentage of the epoxy resin and phenol resin), the body pigment in an amount of about 53% by mass, the rust-preventive pigment in an amount of about 10% by mass, and the coloring pigment in an amount of about 10% by mass, when the coating layer 4 was 100% by mass. Moreover, in the present rust-preventive metallic member 1 according to Example No. 14, the powdery coating material was pulverized for 180 minutes.

Example No. 15

Except that the composition of the coating composition differed from that of the coating composition in Example No. 1, a rust-preventive metallic member 1 according to Example No. 15 of the present invention was manufactured in the same manner as the present rust-preventive metallic member 1 according to Example No. 1. The present rust-preventive metallic member 1 according to Example No. 15 was manufactured using a mixture of the following as the coating composition: methyl ethyl ketone in an amount of 56 parts by mass; an epoxy resin in an amount of 7 parts by mass; a phenol resin in an amount of 7 parts by mass; magnesium silicate in an amount of 21 parts by mass; zinc phosphate in an amount of 4 parts by mass; and titanium oxide in an amount of 5 parts by mass, when they made 100 parts by mass, the entire coating composition. In the present rust-preventive metallic member 1 according to Example No. 15, note that the coating layer 4 comprised the resinous material in an amount of about 32% by mass (i.e., a summed mass percentage of the epoxy resin and phenol resin), the body pigment in an amount of about 48% by mass, the rust-preventive pigment in an amount of about 9% by mass, and the coloring pigment in an amount of about 11% by mass, when the coating layer 4 was 100% by mass. Moreover, in the present rust-preventive metallic member 1 according to Example No. 15, the powdery coating material was pulverized for 180 minutes.

Example No. 16

Except that the composition of the coating composition differed from that of the coating composition in Example No. 1, a rust-preventive metallic member 1 according to Example No. 16 of the present invention was manufactured in the same manner as the present rust-preventive metallic member 1 according to Example No. 1. The present rust-preventive metallic member 1 according to Example No. 16 was manufactured using a mixture of the following as the coating composition: methyl ethyl ketone in an amount of 54 parts by mass; an epoxy resin in an amount of 7 parts by mass; a phenol resin in an amount of 7 parts by mass; magnesium silicate in an amount of 21 parts by mass; zinc phosphate in an amount of 6 parts by mass; and titanium oxide in an amount of 5 parts by mass, when they made 100 parts by mass, the entire coating composition. In the present rust-preventive metallic member 1 according to Example No. 16, note that the coating layer 4 comprised the resinous material in an amount of about 30% by mass (i.e., a summed mass percentage of the epoxy resin and phenol resin), the body pigment in an amount of about 46% by mass, the rust-preventive pigment in an amount of about 13% by mass, and the coloring pigment in an amount of about 11% by mass, when the coating layer 4 was 100% by mass. Moreover, in the present rust-preventive metallic member 1 according to Example No. 16, the powdery coating material was pulverized for 180 minutes.

Example No. 17

Except that the composition of the coating composition differed from that of the coating composition in Example No. 1, a rust-preventive metallic member 1 according to Example No. 17 of the present invention was manufactured in the same manner as the present rust-preventive metallic member 1 according to Example No. 1. The present rust-preventive metallic member 1 according to Example No. 17 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; calcium phosphate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 17, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 17, the powdery coating material was pulverized for 180 minutes.

Example No. 18

Except that the composition of the coating composition differed from that of the coating composition in Example No. 1, a rust-preventive metallic member 1 according to Example No. 18 of the present invention was manufactured in the same manner as the present rust-preventive metallic member 1 according to Example No. 1. The present rust-preventive metallic member 1 according to Example No. 18 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; manganese phosphate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 18, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 18, the powdery coating material was pulverized for 180 minutes.

Example No. 19

Except that the composition of the coating composition differed from that of the coating composition in Example No. 1, a rust-preventive metallic member 1 according to Example No. 19 of the present invention was manufactured in the same manner as the present rust-preventive metallic member 1 according to Example No. 1. The present rust-preventive metallic member 1 according to Example No. 19 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; aluminum phosphate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 19, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 19, the powdery coating material was pulverized for 180 minutes.

Example No. 20

Except that the composition of the coating composition differed from that of the coating composition in Example No. 1, a rust-preventive metallic member 1 according to Example No. 20 of the present invention was manufactured in the same manner as the present rust-preventive metallic member 1 according to Example No. 1. The present rust-preventive metallic member 1 according to Example No. 20 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; zinc phosphite (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 20, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 20, the powdery coating material was pulverized for 180 minutes.

Example No. 21

Except that the composition of the coating composition differed from that of the coating composition in Example No. 1, a rust-preventive metallic member 1 according to Example No. 21 of the present invention was manufactured in the same manner as the present rust-preventive metallic member 1 according to Example No. 1. The present rust-preventive metallic member 1 according to Example No. 21 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; calcium phosphite (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 21, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 21, the powdery coating material was pulverized for 180 minutes.

Example No. 22

Except that the composition of the coating composition differed from that of the coating composition in Example No. 1, a rust-preventive metallic member 1 according to Example No. 22 of the present invention was manufactured in the same manner as the present rust-preventive metallic member 1 according to Example No. 1. The present rust-preventive metallic member 1 according to Example No. 22 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; magnesium phosphite (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 22, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 22, the powdery coating material was pulverized for 180 minutes.

Example No. 23

Except that the composition of the coating composition differed from that of the coating composition in Example No. 1, a rust-preventive metallic member 1 according to Example No. 23 of the present invention was manufactured in the same manner as the present rust-preventive metallic member 1 according to Example No. 1. The present rust-preventive metallic member 1 according to Example No. 23 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; aluminum phosphite (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 23, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 23, the powdery coating material was pulverized for 180 minutes.

Example No. 24

Except that the composition of the coating composition differed from that of the coating composition in Example No. 1, a rust-preventive metallic member 1 according to Example No. 24 of the present invention was manufactured in the same manner as the present rust-preventive metallic member 1 according to Example No. 1. The present rust-preventive metallic member 1 according to Example No. 24 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; zinc polyphosphate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 24, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 24, the powdery coating material was pulverized for 180 minutes.

Example No. 25

Except that the composition of the coating composition differed from that of the coating composition in Example No. 1, a rust-preventive metallic member 1 according to Example No. 25 of the present invention was manufactured in the same manner as the present rust-preventive metallic member 1 according to Example No. 1. The present rust-preventive metallic member 1 according to Example No. 25 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; calcium polyphosphate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 25, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 25, the powdery coating material was pulverized for 180 minutes.

Example No. 26

Except that the composition of the coating composition differed from that of the coating composition in Example No. 1, a rust-preventive metallic member 1 according to Example No. 26 of the present invention was manufactured in the same manner as the present rust-preventive metallic member 1 according to Example No. 1. The present rust-preventive metallic member 1 according to Example No. 26 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; magnesium polyphosphate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 26, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 26, the powdery coating material was pulverized for 180 minutes.

Example No. 27

Except that the composition of the coating composition differed from that of the coating composition in Example No. 1, a rust-preventive metallic member 1 according to Example No. 27 of the present invention was manufactured in the same manner as the present rust-preventive metallic member 1 according to Example No. 1. The present rust-preventive metallic member 1 according to Example No. 27 was manufactured using a mixture of the following as the coating composition: methyl ethyl ketone in an amount of 55 parts by mass; a phenol resin in an amount of 14 parts by mass; magnesium silicate in an amount of 21 parts by mass; aluminum polyphosphate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 27, note that the coating layer 4 comprised the resinous material in an amount of about 31% by mass, the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 27, the powdery coating material was pulverized for 180 minutes.

Example No. 28

Except that the composition of the coating composition differed from that of the coating composition in Example No. 1, a rust-preventive metallic member 1 according to Example No. 28 of the present invention was manufactured in the same manner as the present rust-preventive metallic member 1 according to Example No. 1. The present rust-preventive metallic member 1 according to Example No. 28 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; sodium silicate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 28, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 28, the powdery coating material was pulverized for 180 minutes.

Example No. 29

Except that the composition of the coating composition differed from that of the coating composition in Example No. 1, a rust-preventive metallic member 1 according to Example No. 29 of the present invention was manufactured in the same manner as the present rust-preventive metallic member 1 according to Example No. 1. The present rust-preventive metallic member 1 according to Example No. 29 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; potassium silicate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 29, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 29, the powdery coating material was pulverized for 180 minutes.

Example No. 30

Except that the composition of the coating composition differed from that of the coating composition in Example No. 1, a rust-preventive metallic member 1 according to Example No. 30 of the present invention was manufactured in the same manner as the present rust-preventive metallic member 1 according to Example No. 1. The present rust-preventive metallic member 1 according to Example No. 30 was manufactured using a mixture of the following as the coating composition: methyl ethyl ketone in an amount of 55 parts by mass; an epoxy resin in an amount of 7 parts by mass; a phenol resin in an amount of 7 parts by mass; magnesium silicate in an amount of 21 parts by mass; lithium silicate (i.e., the claimed rust-preventive pigment) in an amount of 5 parts by mass; and titanium oxide in an amount of 5 parts by mass, when they made 100 parts by mass, the entire coating composition. In the present rust-preventive metallic member 1 according to Example No. 30, note that the coating layer 4 comprised the resinous material in an amount of about 31% by mass (i.e., a summed mass percentage of the epoxy resin and phenol resin), the body pigment in an amount of about 47% by mass, the rust-preventive pigment in an amount of about 11% by mass, and the coloring pigment in an amount of about 11% by mass, when the coating layer 4 was 100% by mass. Moreover, in the present rust-preventive metallic member 1 according to Example No. 30, the powdery coating material was pulverized for 180 minutes.

Example No. 31

Except that the composition of the coating composition differed from that of the coating composition in Example No. 1, a rust-preventive metallic member 1 according to Example No. 31 of the present invention was manufactured in the same manner as the present rust-preventive metallic member 1 according to Example No. 1. The present rust-preventive metallic member 1 according to Example No. 31 was manufactured using a mixture of the following as the coating composition: methyl ethyl ketone in an amount of 58 parts by mass; an epoxy resin in an amount of 7 parts by mass; a phenol resin in an amount of 7 parts by mass; magnesium silicate in an amount of 21 parts by mass; zinc phosphate in an amount of 2 parts by mass; and titanium oxide in an amount of 5 parts by mass, when they made 100 parts by mass, the entire coating composition. In the present rust-preventive metallic member 1 according to Example No. 31, note that the coating layer 4 comprised the resinous material in an amount of about 33% by mass (i.e., a summed mass percentage of the epoxy resin and phenol resin), the body pigment in an amount of about 50% by mass, the rust-preventive pigment in an amount of about 5% by mass, and the coloring pigment in an amount of about 12% by mass, when the coating layer 4 was 100% by mass. Moreover, in the present rust-preventive metallic member 1 according to Example No. 31, the powdery coating material was pulverized for 180 minutes.

Example No. 32

Except that the composition of the coating composition differed from that of the coating composition in Example No. 1, a rust-preventive metallic member 1 according to Example No. 32 of the present invention was manufactured in the same manner as the present rust-preventive metallic member 1 according to Example No. 1. The present rust-preventive metallic member 1 according to Example No. 32 was manufactured using a mixture of the following as the coating composition: methyl ethyl ketone in an amount of 52 parts by mass; an epoxy resin in an amount of 7 parts by mass; a phenol resin in an amount of 7 parts by mass; magnesium silicate in an amount of 21 parts by mass; zinc phosphate in an amount of 8 parts by mass; and titanium oxide in an amount of 5 parts by mass, when they made 100 parts by mass, the entire coating composition. In the present rust-preventive metallic member 1 according to Example No. 32, note that the coating layer 4 comprised the resinous material in an amount of about 29% by mass (i.e., a summed mass percentage of the epoxy resin and phenol resin), the body pigment in an amount of about 44% by mass, the rust-preventive pigment in an amount of about 17% by mass, and the coloring pigment in an amount of about 10% by mass, when the coating layer 4 was 100% by mass. Moreover, in the present rust-preventive metallic member 1 according to Example No. 32, the powdery coating material was pulverized for 180 minutes.

Example No. 33

Except that the powdery coating material was pulverized for a shorter period time than that was pulverized in Example No. 5 (that is, the body pigment of the coating composition in Example No. 33 had a larger average particle diameter than that of the coating composition in Example No. 5), a rust-preventive metallic member 1 according to Example No. 33 of the present invention was manufactured in the same manner as the present rust-preventive metallic member 1 according to Example No. 5. The present rust-preventive metallic member 1 according to Example No. 33 was manufactured using a mixture of the following as the coating composition: methyl ethyl ketone in an amount of 54 parts by mass; an epoxy resin in an amount of 7.5 parts by mass; a phenol resin in an amount of 7.5 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 33, note that the coating layer 4 comprised the resinous material in an amount of about 33% by mass (i.e., a summed mass percentage of the epoxy resin and phenol resin), the body pigment in an amount of about 46% by mass, the rust-preventive pigment in an amount of about 11% by mass, and the coloring pigment in an amount of about 11% by mass, when the coating layer 4 was 100% by mass. Note that, in the present rust-preventive metallic member 1 according to Example No. 33, the powdery coating material was pulverized for 20 minutes.

Example No. 34

Except that the powdery coating material was pulverized for a longer period time than that was pulverized in Example No. 5 (that is, the body pigment of the coating composition in Example No. 34 had a smaller average particle diameter than that of the coating composition in Example No. 5), a rust-preventive metallic member 1 according to Example No. 34 of the present invention was manufactured in the same manner as the present rust-preventive metallic member 1 according to Example No. 5. The present rust-preventive metallic member 1 according to Example No. 34 was manufactured using a mixture of the following as the coating composition: methyl ethyl ketone in an amount of 54 parts by mass; an epoxy resin in an amount of 7.5 parts by mass; a phenol resin in an amount of 7.5 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 34, note that the coating layer 4 comprised the resinous material in an amount of about 33% by mass (i.e., a summed mass percentage of the epoxy resin and phenol resin), the body pigment in an amount of about 46% by mass, the rust-preventive pigment in an amount of about 11% by mass, and the coloring pigment in an amount of about 11% by mass, when the coating layer 4 was 100% by mass. Note that, in the present rust-preventive metallic member 1 according to Example No. 34, the powdery coating material was pulverized for 320 minutes.

Example No. 35

Except that the powdery coating material was pulverized for a shorter period time than that was pulverized in Example No. 5 (that is, the body pigment of the coating composition in Example No. 35 had a larger average particle diameter than that of the coating composition in Example No. 5), a rust-preventive metallic member 1 according to Example No. 35 of the present invention was manufactured in the same manner as the present rust-preventive metallic member 1 according to Example No. 5. The present rust-preventive metallic member 1 according to Example No. 35 was manufactured using a mixture of the following as the coating composition: methyl ethyl ketone in an amount of 54 parts by mass; an epoxy resin in an amount of 7.5 parts by mass; a phenol resin in an amount of 7.5 parts by mass; magnesium silicate in an amount of 21 parts by mass; zinc phosphate in an amount of 5 parts by mass; and titanium oxide in an amount of 5 parts by mass, when they made 100 parts by mass, the entire coating composition. In the present rust-preventive metallic member 1 according to Example No. 35, note that the coating layer 4 comprised the resinous material in an amount of about 33% by mass (i.e., a summed mass percentage of the epoxy resin and phenol resin), the body pigment in an amount of about 46% by mass, the rust-preventive pigment in an amount of about 11% by mass, and the coloring pigment in an amount of about 11% by mass, when the coating layer 4 was 100% by mass. Note that, in the present rust-preventive metallic member 1 according to Example No. 35, the powdery coating material was pulverized for 5 minutes.

Comparative Example No. 1

Except that a rust-preventive metallic member according to Comparative Example No. 1 did not have any coating layer, it had the same construction as that of the present rust-preventive metallic member 1 according to Example No. 1.

Comparative Example No. 2

Except that the composition of the coating composition differed from that of the coating composition in Example No. 1, a rust-preventive metallic member according to Comparative Example No. 2 was manufactured in the same manner as the present rust-preventive metallic member 1 according to Example No. 1. The rust-preventive metallic member according to Comparative Example No. 2 was manufactured using a mixture of the following as the coating composition: methyl ethyl ketone in an amount of 60 parts by mass; an epoxy resin in an amount of 7 parts by mass; a phenol resin in an amount of 7 parts by mass; magnesium silicate in an amount of 21 parts by mass; and titanium oxide in an amount of 5 parts by mass, when they made 100 parts by mass, the entire coating composition. That is, the resultant coating layer in the rust-preventive metallic member according to Comparative Example No. 2 did not contain any rust-preventive pigment at all. In the rust-preventive metallic member according to Comparative Example No. 2, note that the coating layer comprised the resinous material in an amount of about 35% by mass (i.e., a summed mass percentage of the epoxy resin and phenol resin), the body pigment in an amount of about 53% by mass, and the coloring pigment in an amount of about 13% by mass, when the coating layer was 100% by mass. Moreover, in the rust-preventive metallic member according to Comparative Example No. 2, the powdery coating material was pulverized for 180 minutes.

Evaluation Tests (1) Rust-Preventive Performance Test

The present rust-preventive metallic members 1 according to Example Nos. 1 through 35, and the rust-preventive metallic members according Comparative Example Nos. 1 and 2 were subjected to a rust-preventive performance test. Note that the rust-preventive performance test was a salt-water spraying test that was carried out in accordance with JIS (Japanese Industrial Standards) "Z 2371." Moreover, in the rust-preventive performance test, five pieces each of the rust-preventive metallic members 1 according to the examples, and five pieces each of the rust-preventive metallic members according to the comparative examples were examined.

Results of the rust-preventive performance test are given in Tables 1 through 4 below. The rust-preventive metallic members were rated "AAA" (or best) when no red rust occurred thereon after 2,000 hours or more had passed since the start of the rust-preventive performance test. The rust-preventive metallic members were rated "AA" (or better) when no red rust occurred thereon after less than 1,500 hours had passed since the start of the rust-preventive performance test, but when red rust occurred thereon after running the test for a time period of from 1,500 to 2,000 hours. The rust-preventive metallic members were rated "A" (or good) when no red rust occurred thereon after less than 1,000 hours had passed since the start of the rust-preventive performance test, but when red rust occurred on one of the five pieces after running the test for a time period of from 1,000 to 1,500 hours. The rust-preventive metallic members were rated "B" (or satisfactory) when no red rust occurred thereon after less than 1,000 hours had passed since the start of the rust-preventive performance test, but when red rust occurred on from two to five of the five pieces after running the test for a time period of from 1,000 to 1,500 hours. The other rust-preventive metallic members that did not meet the above criteria were rated "C" (or failure). Note that it is possible to say that the rust-preventive metallic members that were rated from "AAA" to "B" demonstrated good rust-preventive performance.

(2) Scratch-Hardness (Pencil Method) Evaluation Test

The present rust-preventive metallic members 1 according to Example Nos. 1 through 35, and the rust-preventive metallic members according Comparative Example Nos. 1 and 2 were examined for a scratch hardness of their coating layers by means of pencil method. Results of the scratch-hardness (pencil method) evaluation test are given in Tables 1 through 4 below. Note that the scratch hardness was measured in accordance with JIS "K 5600-5-4." Moreover, the rust-preventive metallic member according to Comparative Example No. 1 was examined for the scratch hardness of the zinc composite coating film alone by means of pencil method.

(3) Come-Off Resistance Evaluation Test

The present rust-preventive metallic members 1 according to Example Nos. 1 through 35, and the rust-preventive metallic members according Comparative Example Nos. 1 and 2 were subjected to a come-off resistance evaluation test. The come-off resistance evaluation test was carried out in the following manner: 30 pieces each of the rust-preventive metallic members according to the examples and comparative examples were expanded to their maximum diameters with pliers; and then the presence or absence of come-off coating layer from the rust-preventive metallic members was observed visually. Note that the rust-preventive metallic members according to the examples and comparative examples were made of the cylinder-shaped metallic substrate shown in FIG. 1 that had the identical dimensions of 0.7-mm thickness, 8-mm width and 8.6-mm diameter (or free diameter) one another. Results of the come-off resistance evaluation test are given in Tables 1 through 4 below. Note that, when 30 pieces each of the rust-preventive metallic members were observed, the rust-preventive metallic members were rated "AA" (or better) if those in which the occurrence of come-off coating layer was appreciated accounted for a proportion (that is, percentage, %) of 10% or less; the rust-preventive metallic members were rated "A" (or good) if those in which the occurrence of come-off coating layer was appreciated accounted for a proportion of from more than 10% to 20% or less; the rust-preventive metallic members were rated "B" (or satisfactory) if those in which the occurrence of come-off coating layer was appreciated accounted for a proportion of from more than 20% to 30% or less; and the rust-preventive metallic members were rated "C" (or failure) if those in which the occurrence of come-off coating layer was appreciated accounted for a proportion of more than 30%. It is possible to say that the rust-preventive metallic members, which were rated from "AA" to "B," had the coating layers that were less likely to come off from the cylinder-shaped metallic substrates.

(4) Particle-Diameter Evaluation Test

Magnesium silicate, one of the claimed body pigments, was subjected to a particle-diameter evaluation test. A particle diameter of magnesium silicate was measured based on a laser diffraction particle-size analyzing method. As a measuring apparatus, "SALD-2200" Multi-functional Sampler, a laser diffraction particle-size analyzer that was manufactured by SHIMADZU SEISHAKUSHO Co., Ltd., was used. To be concrete, a first sample of magnesium silicate (hereinafter referred to as "Sample No. 1") was prepared by pulverizing magnesium silicate for 20 minutes using a beads mill under the same conditions as the powdery coating material was pulverized in Example No. 33; and a second sample of magnesium silicate (hereinafter referred to as "Sample No. 2") was prepared by pulverizing magnesium silicate for 180 minutes using a beads mill under the same conditions as the powdery coating material was pulverized in Example Nos. 1 through 32 and Comparative Example No. 2. Then, each of Sample Nos. 1 and 2 was put into a container, respectively, and was shook fully to uniformly distribute the pulverized magnesium silicate in the container. Subsequently, a part of each of Sample Nos. 1 and 2 was charged into a sampler bath of the measuring apparatus, respectively, until the pulverized magnesium silicate made an adequate concentration. Thereafter, the measuring apparatus was actuated to circulate Sample Nos. 1 and 2, respectively, within the sampler for about 30 seconds. Note that the sampler bath had been filled with a dispersion medium (e.g., ethyl alcohol) in advance and the pump had been activated beforehand. Eventually, the measuring apparatus started carrying out a laser diffraction analysis on Sample Nos. 1 and 2 after they had been circulated in the sampler for about 30 seconds. In this instance, note that the measuring apparatus set the refractive index in a range of from 1.70 to 0.00i. Results of the particle-diameter evaluation test are illustrated in FIG. 3, and are also given in Table 4 below.

Figure 3:
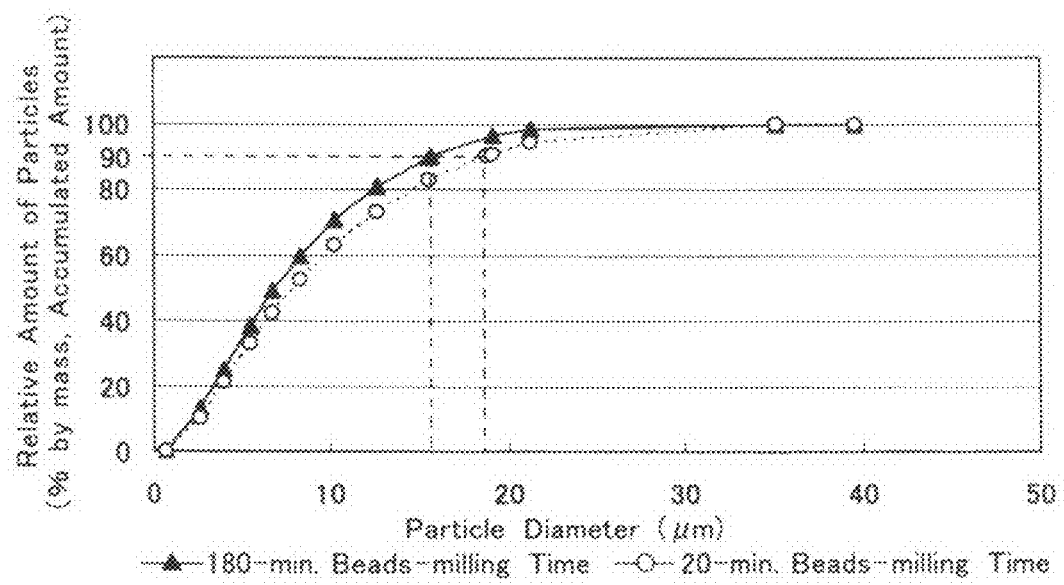
FIG. 3 is a graph for illustrating results of a particle-diameter evaluation test on a body pigment.

As illustrated in FIG. 3, Sample No. 1, that is, magnesium silicate that was pulverized with a beads mill for 20 minutes, exhibited a D90 value of 18.613 μm, a mass accumulated particle diameter according to the laser diffraction particle-size analyzing method. In other words, 10% by mass of Sample No. 1, that is, 10% by mass of the body pigment that was pulverized with a beads mill for 20 minutes, had a particle diameter of 18.613 μm or more. On the other hand, Sample No. 2, that is, magnesium silicate that was pulverized with a beads mill for 180 minutes, exhibited a D90 value of 15.602 μm, a mass accumulated particle diameter according to the laser diffraction particle-size analyzing method. In other words, 10% by mass of Sample No. 2, that is, 10% by mass of the body pigment that was pulverized with a beads mill for 180 minutes, had a particle diameter of 15.602 μm or more. Note that, when the total amount of a sample that is subjected to the laser diffraction particle-size analyzing method is 100% by mass; and when the percentages of the sample's constituent particles that fall in specific particle-diameter groups are accumulated up to 90% by mass from a smaller particle-diameter group side to a larger particle-diameter group side, the D90 value indicates a maximum particle diameter for an accumulated 90% by mass of the constituent particles.

From these results, it is assumed that, in Example Nos. 1 through 32 and Comparative Example No. 2 in which the powdery coating materials are pulverized with a beads mill for 180 minutes, the body pigments being contained in the coating compositions and coating layers would exhibit D90 values that could be approximated to 15.602 μm. On the other hand, when the powdery coating materials are pulverized with a beads mill for 20 minutes, it is assumed that the body pigments being contained in the resultant coating compositions and coating layers would exhibit D90 values that could be approximated to 18.613 μm. For reference, in Example No. 33 in which the powdery coating material was pulverized with a bead mill for 20 minutes, the body pigment being contained in the coating composition and coating layer exhibited 18.6 μm, a D90 value that was close to 18.613 μm, as represented in Table 4. Moreover, in Example No. 35 in which the powdery coating material was pulverized with a bead mill for 5 minutes, the body pigment being contained in the coating composition and coating layer exhibited 18.6 μm, a D90 value that was the same D90 value as being exhibited in Example No. 33, as also represented in Table 4. Consequently, when the powdery coating materials are pulverized by a beads mill for 20 minutes or less, preferably from 15 to 20 minutes, it is possible for the body pigments being contained in the resultant coating compositions and coating layers to keep exhibiting a D90 value of 18 μm or more.

In addition, though not illustrated in FIG. 3, a third sample of magnesium silicate exhibited a D90 value of 13.2 μm. The third sample was prepared by pulverizing magnesium silicate using a beads mill under the same conditions as the powdery coating materials were pulverized in Example No. 34, that is, for a much longer period of time of 320 minutes as in Example No. 34. Therefore, when the above powdery coating materials are pulverized with a beads mill for 320 minutes, it is assumed that the body pigments being contained in the resultant coating compositions and coating layers would exhibit values that could be approximated to 13.2 μm. For reference, in Example No. 34, an example in which the powdery coating material was pulverized with a bead mill for 320 minutes, the body pigment being contained in the coating composition and coating layer exhibited a D90 value of 13.2 μm, as represented in Table 4.

TABLE 1

| | | Example No. | | | | | | | |
|---|---|---|---|---|---|---|---|---|---|
| | | 1 | 2 | 3 | 4 | 5 | 6 | 7 | Comp. Ex. No. 1 |
| Resinous Material (parts by mass) | Epoxy Resin | 14 | 0 | 7 | 5 | 7.5 | 20 | 5 | No Coating Layer |
| | Phenol Resin | 0 | 14 | 7 | 5 | 7.5 | 0 | 0 | |
| Body Pigment (parts by mass) | Magnesium Silicate | 21 | 21 | 21 | 21 | 21 | 21 | 21 | |
| Rust-preventive Pigment (parts by mass) | Zinc Phosphate | 5 | 5 | 5 | 5 | 5 | 5 | 5 | |
| Coloring Pigment (parts by mass) | Titanium Oxide | 5 | 5 | 5 | 5 | 5 | 5 | 5 | |
| Organic Solvent (parts by mass) | Methyl Ethyl Ketone | 55 | 55 | 55 | 59 | 54 | 49 | 64 | |
| Beads-milling Time (min.) | | 180 | 180 | 180 | 180 | 180 | 180 | 180 | Not Applicable |
| Rust-preventive Performance | | A | AA | AA | AA | AA | A | AA | C |
| Scratch Hardness (Pencil Method) | | HB | F | F | HB | F | 3H | B | 8H |
| Come-off Resistance | | AA | A | AA | AA | AA | B | AA | Not Applicable |

TABLE 2

|  |  | Example No. | | | | | | |
|---|---|---|---|---|---|---|---|---|
|  |  | 8 | 9 | 10 | 11 | 12 | 13 | 14 |
| Resinous Material (parts by mass) | Epoxy Resin | 7 | 7 | 7 | 7 | 7 | 7 | 7 |
|  | Phenol Resin | 7 | 7 | 7 | 7 | 7 | 7 | 7 |
| Body Pigment (parts by mass) | Magnesium Silicate | 17 | 24 | 0 | 0 | 0 | 15 | 27 |
|  | Talc | 0 | 0 | 21 | 0 | 0 | 0 | 0 |
|  | Aluminum Sulfate | 0 | 0 | 0 | 21 | 0 | 0 | 0 |
|  | Barium Sulfate | 0 | 0 | 0 | 0 | 21 | 0 | 0 |
| Rust-preventive Pigment (parts by mass) | Zinc Phosphate | 5 | 5 | 5 | 5 | 5 | 5 | 5 |
| Coloring Pigment (parts by mass) | Titanium Oxide | 5 | 5 | 5 | 5 | 5 | 5 | 5 |
| Organic Solvent (parts by mass) | Methyl Ethyl Ketone | 59 | 52 | 55 | 55 | 55 | 61 | 49 |
| Beads-milling Time (min.) |  | 180 | 180 | 180 | 180 | 180 | 180 | 180 |
| Rust-preventive Performance |  | AA | AA | AA | AA | AA | A | AA |
| Scratch Hardness (Pencil Method) |  | F | B | F | F | F | 4H | 2B |
| Come-off Resistance |  | AA | AA | AA | AA | AA | B | AA |

TABLE 3

| | | Example No. | | | | | | | | | |
|---|---|---|---|---|---|---|---|---|---|---|---|
| | | 15 | 16 | 17 | 18 | 19 | 20 | 21 | 22 | 23 | 24 |
| Resinous Material (parts by mass) | Epoxy Resin | 7 | 7 | 7 | 7 | 7 | 7 | 7 | 7 | 7 | 7 |
| | Phenol Resin | 7 | 7 | 7 | 7 | 7 | 7 | 7 | 7 | 7 | 7 |
| Body Pigment (parts by mass) | Magnesium Silicate | 21 | 21 | 21 | 21 | 21 | 21 | 21 | 21 | 21 | 21 |
| Rust-preventive Pigment (parts by mass) | Zinc Phosphate | 4 | 6 | 0 | 0 | 0 | 0 | 0 | 0 | 0 | 0 |
| | Calcium Phosphate | 0 | 0 | 5 | 0 | 0 | 0 | 0 | 0 | 0 | 0 |
| | Magnesium Phosphate | 0 | 0 | 0 | 5 | 0 | 0 | 0 | 0 | 0 | 0 |
| | Aluminum Phosphate | 0 | 0 | 0 | 0 | 5 | 0 | 0 | 0 | 0 | 0 |
| | Zinc Phosphite | 0 | 0 | 0 | 0 | 0 | 5 | 0 | 0 | 0 | 0 |
| | Calcium Phosphite | 0 | 0 | 0 | 0 | 0 | 0 | 5 | 0 | 0 | 0 |
| | Magnesium Phosphite | 0 | 0 | 0 | 0 | 0 | 0 | 0 | 5 | 0 | 0 |
| | Aluminum Phosphite | 0 | 0 | 0 | 0 | 0 | 0 | 0 | 0 | 5 | 0 |
| | Zinc Polyphosphate | 0 | 0 | 0 | 0 | 0 | 0 | 0 | 0 | 0 | 5 |
| | Calcium Polyphosphate | 0 | 0 | 0 | 0 | 0 | 0 | 0 | 0 | 0 | 0 |
| | Magnesium Polyphosphate | 0 | 0 | 0 | 0 | 0 | 0 | 0 | 0 | 0 | 0 |
| | Aluminum Polyphosphate | 0 | 0 | 0 | 0 | 0 | 0 | 0 | 0 | 0 | 0 |
| | Sodium Silicate | 0 | 0 | 0 | 0 | 0 | 0 | 0 | 0 | 0 | 0 |
| | Potassium Silicate | 0 | 0 | 0 | 0 | 0 | 0 | 0 | 0 | 0 | 0 |
| | Lithium Silicate | 0 | 0 | 0 | 0 | 0 | 0 | 0 | 0 | 0 | 0 |
| Coloring Pigment (parts by mass) | Titanium Oxide | 5 | 5 | 5 | 5 | 5 | 5 | 5 | 5 | 5 | 5 |
| Organic Solvent (parts by mass) | Methyl Ethyl Ketone | 56 | 54 | 55 | 55 | 55 | 55 | 55 | 55 | 55 | 55 |
| Beads-milling Time (min.) | | 180 | 180 | 180 | 180 | 180 | 180 | 180 | 180 | 180 | 180 |
| Rust-preventive Performance | | AA | AA | AA | AA | AA | AA | AA | AA | AA | AA |
| Scratch Hardness (Pencil Method) | | F | F | F | F | F | F | F | F | F | F |
| Come-off Resistance | | AA | AA | AA | AA | AA | AA | AA | AA | AA | AA |

| | | Example No. | | | | | | | | Comp. Ex. |
|---|---|---|---|---|---|---|---|---|---|---|
| | | 25 | 26 | 27 | 28 | 29 | 30 | 31 | 32 | No. 2 |
| Resinous Material (parts by mass) | Epoxy Resin | 7 | 7 | 0 | 7 | 7 | 7 | 7 | 7 | 7 |
| | Phenol Resin | 7 | 7 | 14 | 7 | 7 | 7 | 7 | 7 | 7 |
| Body Pigment (parts by mass) | Magnesium Silicate | 21 | 21 | 21 | 21 | 21 | 21 | 21 | 21 | 21 |
| Rust-preventive Pigment (parts by mass) | Zinc Phosphate | 0 | 0 | 0 | 0 | 0 | 0 | 2 | 8 | 0 |
| | Calcium Phosphate | 0 | 0 | 0 | 0 | 0 | 0 | 0 | 0 | 0 |
| | Magnesium Phosphate | 0 | 0 | 0 | 0 | 0 | 0 | 0 | 0 | 0 |
| | Aluminum Phosphate | 0 | 0 | 0 | 0 | 0 | 0 | 0 | 0 | 0 |
| | Zinc Phosphite | 0 | 0 | 0 | 0 | 0 | 0 | 0 | 0 | 0 |
| | Calcium Phosphite | 0 | 0 | 0 | 0 | 0 | 0 | 0 | 0 | 0 |
| | Magnesium Phosphite | 0 | 0 | 0 | 0 | 0 | 0 | 0 | 0 | 0 |
| | Aluminum Phosphite | 0 | 0 | 0 | 0 | 0 | 0 | 0 | 0 | 0 |
| | Zinc Polyphosphate | 0 | 0 | 0 | 0 | 0 | 0 | 0 | 0 | 0 |
| | Calcium Polyphosphate | 5 | 0 | 0 | 0 | 0 | 0 | 0 | 0 | 0 |
| | Magnesium Polyphosphate | 0 | 5 | 0 | 0 | 0 | 0 | 0 | 0 | 0 |
| | Aluminum Polyphosphate | 0 | 0 | 5 | 0 | 0 | 0 | 0 | 0 | 0 |
| | Sodium | 0 | 0 | 0 | 5 | 0 | 0 | 0 | 0 | 0 |

TABLE 3-continued

|  | Silicate Potassium Silicate | 0 | 0 | 0 | 0 | 5 | 0 | 0 | 0 | 0 |
|---|---|---|---|---|---|---|---|---|---|---|
|  | Lithium Silicate | 0 | 0 | 0 | 0 | 0 | 5 | 0 | 0 | 0 |
| Coloring Pigment (parts by mass) | Titanium Oxide | 5 | 5 | 5 | 5 | 5 | 5 | 5 | 5 | 5 |
| Organic Solvent (parts by mass) | Methyl Ethyl Ketone | 55 | 55 | 55 | 55 | 55 | 55 | 58 | 52 | 60 |
| Beads-milling Time (min.) |  | 180 | 180 | 180 | 180 | 180 | 180 | 180 | 180 | 180 |
| Rust-preventive Performance |  | AA | AA | AA | AA | AA | AA | B | AA | C |
| Scratch Hardness (Pencil Method) |  | F | F | F | F | F | F | HB | 4H | HB |
| Come-off Resistance |  | AA | AA | AA | AA | AA | AA | AA | B | AA |

TABLE 4

|  |  | Example No. | | | |
|---|---|---|---|---|---|
|  |  | 5 | 33 | 34 | 35 |
| Resinous Material (parts by mass) | Epoxy Resin | 7.5 | 7.5 | 7.5 | 7.5 |
|  | Phenol Resin | 7.5 | 7.5 | 7.5 | 7.5 |
| Body Pigment (parts by mass) | Magnesium Silicate | 21 | 21 | 21 | 21 |
| Rust-preventive Pigment (parts by mass) | Zinc Phosphate | 5 | 5 | 5 | 5 |
| Coloring Pigment (parts by mass) | Titanium Oxide | 5 | 5 | 5 | 5 |
| Organic Solvent (pats by mass) | Methyl Ethyl Ketone | 54 | 54 | 54 | 54 |
| Beads-milling Time (min.) |  | 180 | 20 | 320 | 5 |
| D90, Mass-accumulated Particle Diameter of Body Pigment (μm) |  | 15.6 | 18.6 | 13.2 | 18.6 |
| Mass-average Particle Diameter of Body Pigment (μm) |  | 6.4 | 8.1 | 5.4 | 8.1 |
| Rust-preventive Performance |  | AA | AAA | A | AAA |
| Scratch Hardness (Pencil Method) |  | F | F | F | F |
| Come-off Resistance |  | AA | AA | AA | AA |

As can be seen from Table 1 through Table 4, the rust-preventive metallic members according to Comparative Example Nos. 1 and 2 exhibited rust-preventive performance being rated "C" (or failure). On the contrary, the rust-preventive metallic members 1 according to Example Nos. 1 through 35 exhibited rust-preventive performance being rated from "AAA" (or best) to "B" (or satisfactory). That is, the rust-preventive metallic members 1 according to Example Nos. 1 through 35 were superior to the rust-preventive metallic members according to Comparative Example Nos. 1 and 2 in terms of the rust-preventive performance. It is believed that the advantage resulted from the following:

the rust-preventive metallic members 1 according to Example Nos. 1 through 35 comprised the coating layers 4, whereas the rust-preventive metallic member according to Comparative Example No. 1 was free from the coating layers 4; and the rust-preventive pigments were blended in the coating layers 4 (or the coating compositions) in the rust-preventive metallic members 1 according to Example Nos. 1 through 35, whereas no such rust-preventive pigments were blended in the coating layer (or the coating composition) in the rust-preventive metallic member according to Comparative Example No. 2.

Moreover, as can be seen from Table 1 through Table 4, the rust-preventive metallic members 1 according to Example Nos. 1 through 35 exhibited come-off resistance falling in the ratings of from "AA" (or better) to "B" (or satisfactory). From this result, it is apparent that the coating layers 4 were less likely to come off from the metallic substrate 2 and/or the zinc composite coating film 3 in the rust-preventive metallic members 1 according to Example Nos. 1 through 35. The benefit can be also supported by the fact that the coating layers 4 exhibited the scratch hardness of from "2B" to "4H" (pencil method) in the rust-preventive metallic members 1 according to Example Nos. 1 through 35, whereas the coating layer exhibited the scratch hardness of "8H" (pencil method) in the rust-preventive metallic member according to Comparative Example No. 2. Specifically, the sections other than the metallic substrate 2 (that is, the laminated layers comprising the zinc composite coating film 3 and the coating layers 4) are softer in the rust-preventive metallic members 1 according to Example Nos. 1 through 35 than the sections other than the metallic substrate 2 (that is, the zinc composite coating film 3 alone) in the rust-preventive metallic member according to Comparative Example No. 1. The advantage is believed to result from the fact that the coating layers 4 were softer than the zinc composite coating film 3. Such soft coating layers 4 can deform so as to follow the deformations of the metallic substrate 2. All in all, the coating layers 4 were less likely to come off from the metallic member 2 and/or the zinc composite coating film 3 in the rust-preventive metallic members 1 according to Example Nos. 1 through 35.

Note that the rust-preventive metallic member according to Comparative Example No. 1 was not provided with any coating layer at all. Accordingly, in the rust-preventive metallic member according to Comparative Example No. 1, it was not needed at all to think of such a phenomenon as the come-off coating layers 4.

Moreover, in the coating compositions used to make the rust-prevented metallic members 1 according to Example Nos. 7 and 14, the body pigment, rust-preventive pigment or coloring pigment were observed to sediment therein. The phenomenon is believed to arise from the facts that the blending amount of the resinous material was less comparatively in the coating composition used to make the rust-prevented metallic member 1 according to Example No. 7, and that the blending amount of the body pigment was more relatively in the coating composition used to make the rust-prevented metallic member 1 according to Example No. 14. According to the observation, it is appreciated that the resinous material can preferably be blended in an amount of more than 5% by mass when the coating composition is 100% by mass. On the other hand, it is appreciated that the body pigment can preferably be blended in an amount of less than 27% by mass when the coating composition is 100% by mass.

Note that, in the coating compositions used to make the other rust-prevented metallic members 1 according to Example Nos. 1 through 6, 8 through 13, and 15 through 35, the body pigment, rust-preventive pigment or coloring pigment was not observed to sediment therein. According to the observation, it is appreciated that the resinous material can more preferably be blended in an amount of 10% by mass or more when the coating composition is 100% by mass. On the other hand, it is appreciated that the body pigment can more preferably be blended in an amount of 24% by mass or less when the coating composition is 100% by mass.

Moreover, in the rust-preventive metallic members 1 according to Example Nos. 1 through 5, 7 through 12, 14 through 31, and 33 through 35, the coating layers 4 exhibited better come-off resistance than that did in the rust-preventive metallic member 1 according to Example No. 6. This phenomenon is believed to result from the arrangement that the resinous material was blended more comparatively and the organic solvent was blended less relatively in the coating composition used to make the rust-prevented metallic member 1 according to Example No. 6. The observation leads to the recognition that it is preferable to blend the resinous material in an amount of less than 20% by mass when the coating composition is 100% by mass; and it is more preferable to blend it in an amount of 15% by mass or less when the coating composition is 100% by mass. On the other hand, the observation leads to the recognition that it is preferable to blend the organic solvent in an amount of more than 49% by mass when the coating composition is 100% by mass; and it is more preferable to blend it in an amount of 52% by mass or more when the coating composition is 100% by mass.

In addition, in the rust-preventive metallic members 1 according to Example No. 1 through 5, 7 through 12, 14 through 31, and 33 through 35, the coating layers 4 exhibited better come-off resistance than that did in the rust-preventive metallic member 1 according to Example No. 13. This phenomenon is believed to result from the arrangement that the body pigment was blended less comparatively in the coating composition used to make the rust-prevented metallic member 1 according to Example No. 13. The observation leads to the recognition that it is preferable to blend the body pigment in an amount of more than 15% by mass when the coating composition is 100% by mass; and it is more preferable to blend it in an amount of 17% by mass or more when the coating composition is 100% by mass.

Moreover, the rust-preventive metallic members 1 according to Example Nos. 15 through 31, and 33 through 35 had the coating layers 4 whose come-off resistance is excellent compared with that of the rust-preventive metallic member 1 according to Example No. 32. The difference is believed to result from the arrangement that the rust-preventive pigment was blended more comparatively and the organic solvent was blended less relatively in the coating composition used to make the rust-prevented metallic member 1 according to Example No. 32. It is understood from the difference that the rust-preventive pigment can preferably be blended in an amount of less than 8% by mass, more preferably in an amount of 6% by mass or less, when the coating composition is 100% by mass.

In addition, the rust-preventive metallic members 1 according to Example No. 1 through 5, 7 through 12, 14 through 30, and 32 through 35 exhibited excellent rust-preventive performance compared with that the rust-preventive metallic member 1 according to Example No. 31 exhibited. The difference is believed to result from the arrangement that the rust-preventive pigment was blended less comparatively in the coating composition used to make the rust-prevented metallic member 1 according to Example No. 31. It is understood from the difference that the rust-preventive pigment can preferably be blended in an amount of more than 2% by mass, more preferably in an amount of 4% by mass or more, when the coating composition is 100% by mass.

Note herein that, as can be appreciated from Table 4, the particle diameter of the body pigment that the coating composition and coating layer contains contributes to the rust-preventive performance of the resulting rust-preventive metallic member 1 according to the present invention. When comparing the particle diameters of the body pigment in the rust-preventive metallic members 1 according to Example No. 5 and 33 through 35 with their rust-preventive performance, using the body pigment with larger particle diameter makes it possible to upgrade the rust-preventive performance. The advantage is believed to arise because of the following reasons.

Figure 4:
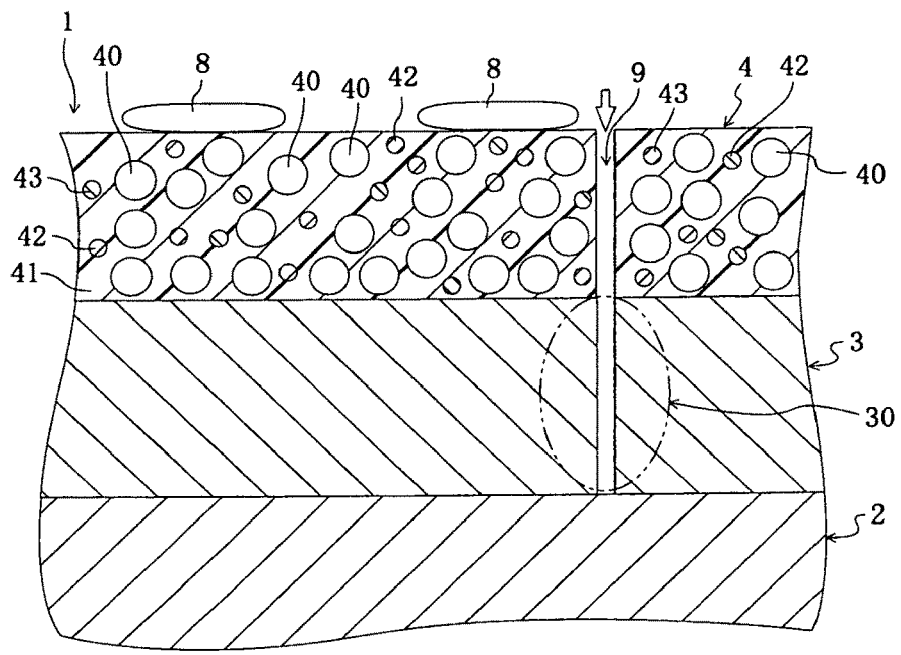
FIG. 4 is an explanatory cross-sectional diagram for schematically illustrating actions of a coating layer in a rust-preventive metallic member according to the present invention.

As illustrated in FIG. 4, a through hole-shaped defect 9 might occur in the coating layer 4 and zinc composite coating film 3 of the rust-preventive metallic member 1. The defect 9 is a passage that the organic solvent in the coating composition has made when evaporating. Accordingly, the occurrence of the defect 9 might be an inevitable phenomenon. If water 8 goes into the defect 9 that has occurred in the coating layer 4 and zinc composite coating film 3, zinc included in the zinc composite coating film 3 ionizes to carry out sacrificing corrosion prevention. The rust-preventive metallic member 1 according to the present invention inhibits the metallic substrate 2 from rusting by means of the rust-preventive action of zinc. However, when the water 8 keeps entering the defect 9 for a long period of time, zinc 30, which is present adjacent to the defect 9 within the zinc composite coating film 3, has ionized completely. If such is the case, rust occurs on the metallic substrate 2 because the sacrificing corrosion preventive action resulting from zinc has lost. On the contrary, zinc, which is separated from the defect 9 within the zinc composite coating film 3, does not ionize to remain therein. Consequently, when the water 8 is supplied to the remaining zinc to ionize it, it is believed possible to sustain the rust-preventive action of zinc for a long period of time.

In order to supply the water 8 to zinc, which is separated from the defect 9 within the zinc composite coating film 3, it is allowable to form passages for the water 8 within the coating layer 4. Note that, in the coating layer 4, minute openings or interstices arise at the boundaries between the body pigments 40 and the resinous material 41, between the rust-preventive pigments 42 and the resinous material 41, and between the coloring pigments 43 and the resinous material 41. Accordingly, it is believed possible to utilize these boundaries as the passages for the water 8. Moreover, note herein that the blending amounts and particle diameters of the rust-preventive pigment 42 and coloring pigment 43 are remarkably small compared with the blending amount and particle diameters of the body pigment 40. Consequently, it is believed that the passages for the water 8 within the coating layer 4 can be made mainly of the boundaries between the body pigments 40 and the resinous material 41 (hereinafter referred to as "passage-making boundaries").

Figure 5:
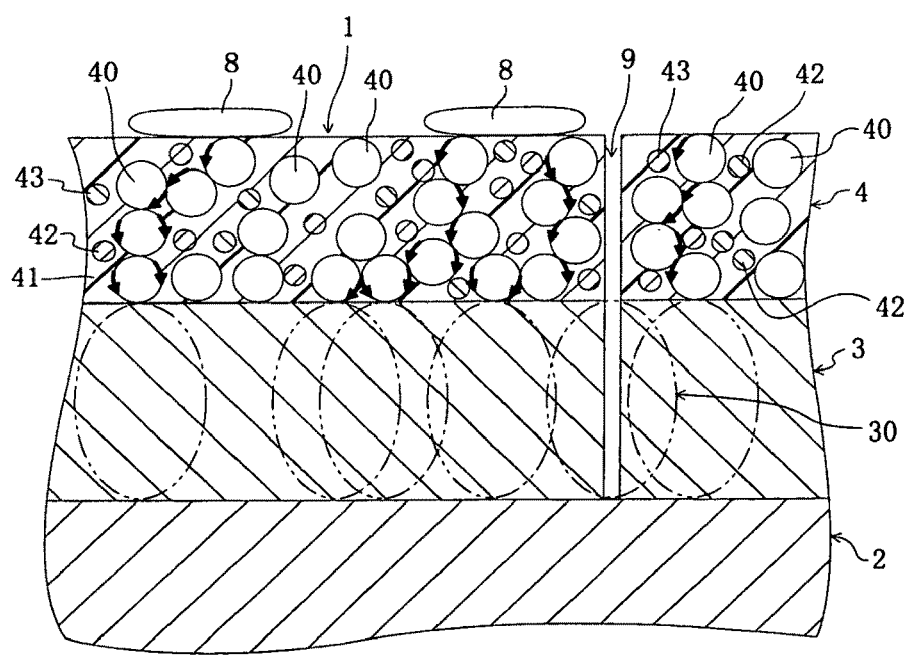
FIG. 5 is another explanatory cross-sectional diagram for schematically illustrating the other actions of a coating layer in a rust-preventive metallic member according to the present invention.

It is highly probable that the distances between the neighboring body pigments 40 can be closer in the case where the body pigments 40 have larger particle diameters (see FIG. 5) than in the case where the body pigments 40 have smaller particle diameters (see FIG. 4). When the distances between the neighboring body pigments 40 are closer, it is highly probable that the neighboring passage-making boundaries can connect to each other, and eventually it is highly probable that the connected passage-making boundaries can penetrate the coating layer 4 in the thickness-wise direction. Hereinafter, the connected passage-making boundaries that penetrate the coating layer 4 in the thickness-wise direction will be referred to as "penetrable boundaries," and are designated with bold arrows in FIG. 5.

The more the number of the penetrable boundaries is, more probable it is that a sufficient amount of the water 8 can be supplied to zinc, which is separated from the defect 9 within the zinc composite coating film 3. To put it differently, using the body pigments 4 with larger particle diameters can furthermore upgrade the rust-preventive performance of the rust-preventive metallic member 1 according to the present invention, because it is possible to form the penetrable boundaries in a great quantity in the zinc composite coating film 3 and thereby it is possible to make use of Zn therein effectively. As represented in Table 4, when the body pigments 40 exhibit a D90 value, a mass accumulated particle diameter being 15 μm or more as in the present rust-preventive metallic member 1 according to Example No. 5, the body pigments 40 can give excellent rust-preventive performance to the present rust-preventive metallic member 1. Moreover, when the body pigments 40 exhibit a D90 value, a mass accumulated particle diameter being 18 μm or more as in the present rust-preventive metallic member 1 according to Example No. 33, the body pigments 40 can give more excellent rust-preventive performance to the present rust-preventive metallic member 1. Note that, in the present rust-preventive metallic members 1 according to Example Nos. 33 and 35, the body pigments 40 exhibited a D90 value of 18 μm or more, and had a mass average particle diameter of 8 μm or more. As a consequence of the above speculation, using the body pigments 40 having a mass average particle diameter of 8 μm or more also enables the present rust-preventive metallic member 1 to demonstrate more excellent rust-preventive performance.

Having now fully described the present invention, it will be apparent to one of ordinary skill in the art that many changes and modifications can be made thereto without departing from the spirit or scope of the present invention as set forth herein including the appended claims.

What is claimed is:

1. A metallic member being subjected to rust-preventive treatment, the metallic member comprising:
    a metallic substrate being formed as a predetermined configuration;
    a zinc composite coating film being disposed on the metallic substrate;
    a coating layer being made by coating and drying a coating composition on the zinc composite coating film; and
    the coating composition comprising a coating vehicle including an organic solvent and a resinous material being dissolved in the organic solvent, a body pigment being dispersed in the coating vehicle, and a rust-preventive pigment being dispersed in the coating vehicle, the organic solvent being one or more members selected from the group consisting of an aromatic solvent, an alcohol solvent, and a ketone solvent;
    wherein the coating layer exhibits a scratch hardness of from "F" to "B" by means of pencil method;
    wherein the body pigment comprises at least one member being selected from the group consisting of talc, magnesium silicate, aluminum sulfate, and barium sulfate; and
    wherein the coating layer comprises the body pigment in an amount of from 42 to 50% by mass when the coating layer is 100% by mass.

2. The metallic member according to claim 1, wherein the rust-preventive pigment comprises at least one member being selected from the group consisting of phosphate and silicate.

3. The metallic member according to claim 1, wherein the rust-preventive pigment comprises at least one member being selected from the group consisting of zinc phosphate, calcium phosphate, magnesium phosphate, aluminum phosphate, zinc phosphite, calcium phosphite, magnesium phosphite, aluminum phosphate, zinc polyphosphate, calcium polyphosphate, magnesium polyphosphate, aluminum polyphosphate, sodium silicate, potassium silicate, and lithium silicate.

4. The metallic member according to claim 1, wherein the coating layer comprises the rust-preventive pigment in an amount of from 9 to 13% by mass when the coating layer is 100% by mass.

5. The metallic member according to claim 1, wherein the body pigment exhibits a D90 value, a mass accumulated particle diameter being 18 μm or more that is measured by means of laser diffraction particle-size analyzing method.

6. The metallic member according to claim 1, wherein the aromatic solvent comprises at least one member being selected from the group consisting of toluene, xylene, and ethylbenzene.

7. The metallic member according to claim 1, wherein the alcohol solvent comprises at least one member being selected from the group consisting of ethylene glycol monobutyl ether, butanol, methanol, and phenol.

8. The metallic member according to claim 1, wherein the ketone solvent comprises at least one member being selected from the group consisting of methyl ethyl ketone, and methyl butyl ketone.

9. The metallic member according to claim 1, wherein the resinous material comprises at least one member being selected from the group consisting of an epoxy resin, a phenol resin, and an acrylic resin.

* * * * *

UNITED STATES PATENT AND TRADEMARK OFFICE
CERTIFICATE OF CORRECTION

PATENT NO. : 8,007,923 B2  Page 1 of 1
APPLICATION NO. : 12/230863
DATED : August 30, 2011
INVENTOR(S) : Sakakibara et al.

It is certified that error appears in the above-identified patent and that said Letters Patent is hereby corrected as shown below:

In the claims, column 38, line 22, please change "phosphate" to --phosphite--.

Signed and Sealed this
Eighth Day of November, 2011

David J. Kappos
*Director of the United States Patent and Trademark Office*